US005639702A

United States Patent [19]
Imashita et al.

[11] Patent Number: 5,639,702
[45] Date of Patent: Jun. 17, 1997

[54] YELLOW COLORED GLASSES AND METHODS OF MAKING SAME

[75] Inventors: Katuhiro Imashita; Shuichi Yokokura, both of Yokohama, Japan

[73] Assignee: Kirin Beer Kabushiki Kaisha, Tokyo, Japan

[21] Appl. No.: 250,764

[22] Filed: May 27, 1994

[30] Foreign Application Priority Data

May 28, 1993 [JP] Japan ................. 5-126997

[51] Int. Cl.$^6$ ................. C03C 3/16
[52] U.S. Cl. ................. 501/44; 65/30.11; 65/30.13; 501/30
[58] Field of Search ................. 65/30.11, 30.13; 501/13, 30, 43, 44, 56, 57, 58, 59, 45; 252/584

[56] References Cited

U.S. PATENT DOCUMENTS

| | | |
|---|---|---|
| 4,226,628 | 10/1980 | Bartholomew et al. ............ 106/47 R |
| 4,290,794 | 9/1981 | Wedding ............ 65/30.11 |
| 4,403,031 | 9/1983 | Borrelli et al. ............ 430/332 |

FOREIGN PATENT DOCUMENTS

| | | |
|---|---|---|
| 60-54895 | 12/1985 | Japan. |
| 63-215524 | 9/1988 | Japan. |
| 63-54659 | 10/1988 | Japan. |

OTHER PUBLICATIONS

Volf, Milos B., Chemical Approach to Glass (Glass Science and Technology; vol. 7), Elsevier Science Publishing Co., Inc., Amsterdam, pp. 562–577.

Primary Examiner—Donald E. Czaja
Assistant Examiner—Sean Vincent
Attorney, Agent, or Firm—Foley & Lardner

[57] ABSTRACT

Glass colored in yellow, having transmission in the visible light range of the spectrum, which is produced by blending or adding an iodine compound to a matrix of glass having transmission in the visible light range of the spectrum or to the raw materials thereof. The glass has a yellow color of high excitation purity, is stable in color, and has good spectral properties.

10 Claims, 2 Drawing Sheets

YELLOW COLORED GLASSES AND METHODS OF MAKING SAME

BACKGROUND OF THE INVENTION

1. Field of the Invention

The present invention relates to glasses colored in yellow, and more particularly to colored glasses in which a yellow color of high excitation purity has been developed, and which have an extremely low transmittance in the vicinity of 500 nm or shorter. Because of the above-described properties, the glasses can be utilized for various types of art glass and decoration glass, optical filters and the like.

2. Related Art

In order to color glass in yellow, a colored ion such as $Cr^{6+}$, $V^{5+}$, $Ni^{2+}$, $Ti^{2+}$ or $Ce^{4+}$ has been conventionally used. The coloring of glass with such a colored ion is greatly affected by the ion concentration, the atmosphere under which the glass is melted, and the glass-melting temperature. In particular, the valence of the ion varies with the glass-melting temperature, and, as a result, the absorption wavelength of the glass tends to change. It is thus technically difficult to develop a stable yellow color in glass by using a colored ion. Moreover, it is considerably difficult to develop a pure yellow color of high excitation purity in glass by color development of a colored ion.

On the other hand, there is a method in which a colloid is dispersed in glass to give color thereto. Ag colloid and CdS colloid have been known as colloids which can color glass yellow. In the case where Ag colloid is used for the coloring of glass, a stable color cannot be given to the glass unless the optimum temperature for the formation and growth of metallic crystal nuclei and the thermal reduction reaction are strictly controlled. In the case where CdS colloid is used for the coloring of glass, a clear yellow color can be developed in the glass. However, the CdS colloid, a coloring material, may be volatile at a high temperature at which the glass is melted. In addition, it is difficult to adjust the colloid particle diameter of the CdS colloid by controlling the conditions under which the glass is cooled or heat-treated, so that the spectral properties of the colored glass obtained are readily changeable. Moreover, during the step of melting of the glass, the CdS colloid vaporizes cadmium, which is noxious, so that a cadmium-removing apparatus is needed. It is thus difficult to obtain glasses colored in yellow by the method using CdS colloid on a mass-production scale.

Some cases wherein iodine or an iodine compound is added to glass have been known. For instance, Japanese Laid-Open Patent Publication No. 11248/1985 describes a technique in which an iodine compound is used as a constituent of chalcogenide glass. However, although the chalcogenide glass has transmission in the infrared and RF ranges of the spectrum, it does not have transmission in the visible light range of the spectrum. It is therefore understood that this technique is not for obtaining glasses colored in yellow.

Furthermore, Japanese Laid-Open Patent Publications Nos. 109242/1980 and 215524/1988 disclose a method in which glass is prevented, by the addition of iodine, from foaming during the steps of melting and forming. This method is to impart enhanced transmission in the short wavelength range (in the vicinity of 200–300 nm) of the spectrum to the glass, and it is not a technique for imparting a yellow color to glass.

SUMMARY OF THE INVENTION

An object of the present invention is to solve the aforementioned various problems, thereby obtaining colored glasses having a yellow color of high excitation purity, having color stability, and having good spectral properties.

Glass colored in yellow, having transmission in the visible light range of the spectrum according to the present invention, is characterized in that it is prepared by blending or adding an iodine compound to a base glass material or the raw materials thereof.

A method of preparing glass colored in yellow, having transmission in the visible light range of the spectrum according to the present invention, comprises:

adding or blending an iodine compound with a base glass material having transmission in the visible light range of the spectrum, or the raw materials thereof, and subjecting the resulting mixture to the steps of melting and forming.

The density of the yellow color in the glass of the present invention can be controlled by changing the amount of the iodine compound to be incorporated into the starting raw materials. For this reason, the shortcoming in the prior art, that is, unevenness in the yellow color resulting from the conditions for the heat treatment such as the atmosphere under which the glass is melted and the glass-melting temperature, can be eliminated, and a yellow color can be uniformly imparted to glass.

Further, glass having a pure yellow color whose excitation purity is higher than that of glass with a colored ion can be obtained by the method of the present invention. When a yellow color is imparted to glass having a low melting point, the resulting glass has excellent shaping properties, so that it is very useful for art glass.

Furthermore, the yellow-colored glass according to the present invention transmits almost no light having a short wavelength in the vicinity of 440–520 nm or shorter, so that it can be utilized for a sharp cut filter.

DETAILED DESCRIPTION OF THE INVENTION

Figure 1:
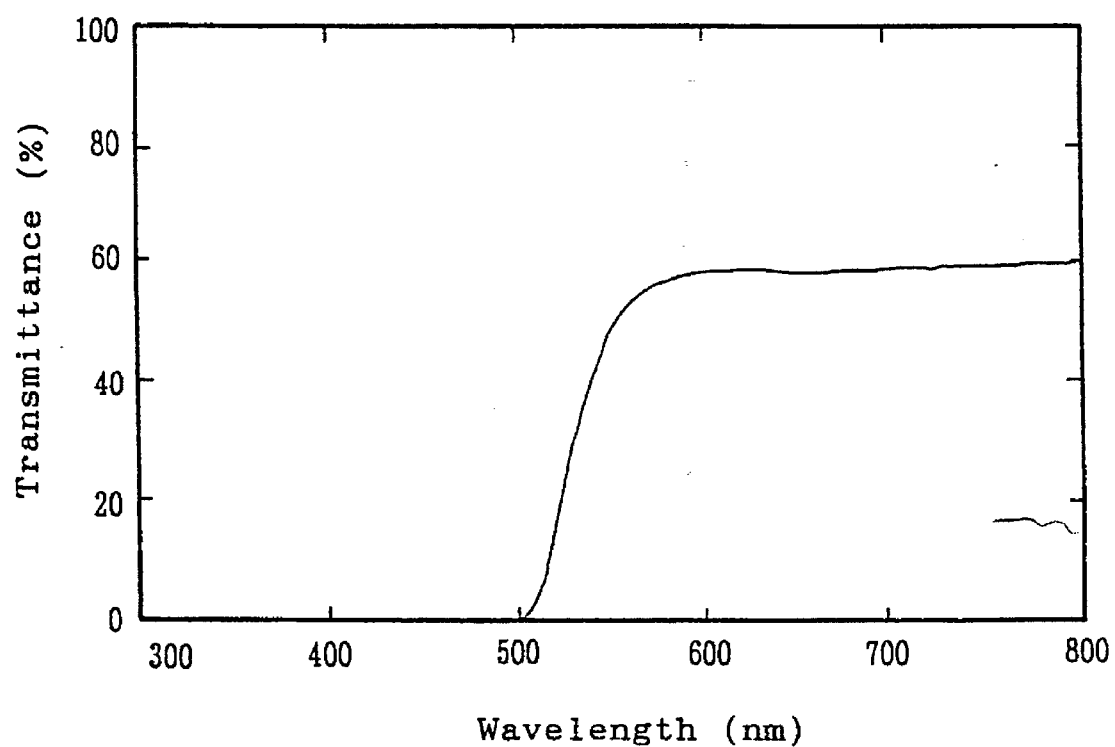
FIG. 1 is a graph showing the spectral transmittance of the yellow-colored glass according to the present invention obtained in Example 1, where the transmittance given is a value obtained by calculation for a thickness of 10mm.

The present invention has succeeded in the production of glass having a pure yellow color of high excitation purity by incorporating iodine or an iodine compound to glass. As mentioned previously, there have been known some cases where an iodine compound is incorporated into glass. However, in any of these cases, the incorporation of an iodine compound is not a measure for imparting color to glass. In addition, in any of these cases, it was not expected that glass having a yellow color of high excitation purity could be obtained when a coloring material comprising, as a color-developing material, an iodine compound is added to or blended with a base glass material having transmission in the visible light range of the spectrum, or the raw materials thereof as in the present invention. The yellow glass thus obtained is stable in color and has excellent spectral properties as compared with conventional glasses colored in yellow. This glass was also found to be very useful for filter glass.

<Introduction of Iodine Compound to Glass>

In order to incorporate iodine into glass, it is suitable to use an iodine compound as a part of raw materials to be used, and to melt the raw materials at a temperature at which iodine or the iodine compound, an yellow-color-developing material, is scarcely vaporized from the base glass material. It is also possible to add the iodine compound to a molten base glass material. The iodine content of the glass produced varies mainly with a melting temperature of the glass used. That is, the higher the melting temperature of glass used, the more easily is the iodine vaporized during the step of melting. For this reason, glass having a substantially lower melting point is preferable when the incorporation of iodine is taken into consideration. A particularly preferable glass is one having a melting point of 800° C. or lower.

In the yellow glass according to the present invention, when the glass has a lower melting point, a greater amount of iodine or an iodine compound can be incorporated into the glass, and a yellow color with a higher density can be imparted to the glass. Although the concentration of iodine in the glass can be made high by increasing the amount of the iodine compound to be added to the raw materials, it is important that the iodine compound not be lost by vaporization. Among the various methods for preventing the loss of iodine by vaporization, the method in which iodine is incorporated into glass in a substantially closed vessel is effective.

<Iodine Compound>

Any iodine compound can be used in the present invention as long as it can introduce iodine into a glass when it is added to a base glass material or the raw materials thereof. Examples of such an iodine compound include inorganic iodine compounds, organic iodine compounds, and iodine. In the case of inorganic iodine compounds, those compounds whose cations can become elements of the glass are preferred. Specifically, such inorganic iodine compounds include $PbI_2$, $SnI_2$, $ZnI_2$, $NaI$ and $KI$. It is difficult to incorporate iodine ($I_2$) into glass because of its sublimability. However, it is possible to incorporate iodine into a glass having a low melting point under pressure. Organic iodine compounds are readily decomposed when glass is melted. However, it is possible to use them in the same manner as is employed for iodine, depending on the melting point of glass or other conditions.

<Applicable Glass>

The types of glass to be used in the present invention can be roughly classified as follows depending on the melting points thereof.

(1) Glass having an extremely low melting point

Belonging to this type is a base glass material that may have a melting point of 400°–500° C. or lower, and whose chemical composition may be of $SnF_2$-$P_2O_5$-X type, $SnCl_2$-$P_2O_5$-X type, or $ZnCl_2$-$P_2O_5$-X type (in these formulas, X is PbO, $PbCl_2$ or the like) (reference is made to U.S. Pat. No. 4,314,031, and Japanese Laid-Open Patent Publications Nos. 124045/1992 and 187945/1991). When glass of $SnF_2$-$P_2O_5$-X type is used, iodine is introduced into the glass by replacing a part of or all of the X component with an iodine compound. When glass of $SnCl_2$-$P_2O_5$-X type, or $ZnCl_2$-$P_2O_5$-X type is used, iodine is introduced into the glass by replacing a part of or all of the chloride with an iodine compound. In these cases, iodine or the iodine compound can be incorporated into the glass in an amount of approximately 15% by weight (based on the total of all the elements). Glass having a pure yellow color with a high density (high excitation purity) can thus be obtained. A preferable iodine compound which can be used as a raw material in glass of this type is $PbI_2$, $SnI_2$ or the like.

(2) Glass having a low melting point

Fluoride glass and lead glass may have a melting point of 700° to 1200° C. In lead glass, the higher the lead content, the lower is the melting point. In the range of the melting point of lead glass (700° to 800° C.), it is possible to incorporate iodine or an iodine compound into the glass in an amount of approximately 10% by weight (based on the total of all the elements). A preferable iodine compound which can be used as a raw material in glass of this type is $PbI_2$, KI, NaI or the like.

(3) Soda-lime glass

Soda-lime glass containing as a glass component 60% by weight or more of $SiO_2$ may have a melting point of 1200° to 1500° C. When colored glass is prepared by melting, iodine is readily vaporized during the step of melting of the glass, which is conducted at a temperature in the range of the above melting point, so that only a small amount of iodine tends to remain in the glass. For this reason, coloring of the glass with a yellow color of high density may not be expected. Therefore, coloring by the present invention of the typical soda-lime glass containing 60% by weight or more of $SiO_2$ may generally result in glass having an extremely light yellow color.

By the method of the present invention, colored glass having a pure yellow color of high excitation purity, containing iodine as a color-developing material can be produced. This glass has such spectral properties that the glass has almost no transmission in the vicinity of 440–520 nm or shorter whereby it has the properties required for sharp cut filters. The density of the yellow color in the glass depends greatly on the melting point of the glass; the lower the melting point of the glass, the higher is the density of the yellow color. It is therefor preferable to use glass having a melting point of 800° C. or lower in order to prepare glass having a yellow color with a high density.

The present invention will now be described more specifically by way of the following examples, which should not be construed as limiting the present invention.

EXAMPLE 1

A mixture of the raw materials of glass, having a chemical composition of 30 mol % of $P_2O_5$ ($NH_4H_2PO_4$ was used as the starting material), 62 mol % of $SnCl_2$, and 8 mol % of $PbI_2$ was placed in an aluminum crucible, melted at 450° C. for 30 minutes, and then cast over a carbon plate.

As the glass was cooled to room temperature, its color changed from transparent red to transparent yellow. The amount of iodine or the iodine compound contained in the raw materials used was 10.3% by weight (as an iodine element), whereas that contained in the glass formed was 7.6% by weight. It was thus found that a sufficient amount of iodine or the iodine compound was contained in the glass obtained. The proportion of the iodine element in the glass was measured by an automatic X-ray fluorescence analyzer (Model RIX 2000 manufactured by Rigaku Co., Ltd.).

The spectral properties of the glass obtained are shown in FIG. 1. The spectral transmittance of the glass was measured by a spectrophotometer, Model UV-2100S manufactured by Shimadzu Corp. A transmittance curve having a transmission threshold wavelength (an absorption edge) of 500 nm was obtained, whereby it was shown that the transmittance at a wavelength of 500 nm or shorter was reduced resulting in a sharp cut of the light of these shorter wavelengths. The chromaticity of this yellow glass shown by the standard colorimetric system CIE (monochromatic specification) is as follows: the lightness (Y) is 41.5%, the dominant wavelength ($\lambda d$) is 579.1 nm, and the excitation purity (Pe) is 98.6%.

EXAMPLE 2

A mixture of the raw materials of glass, having a chemical composition of 40 mol % of $P_2O_5$ ($NH_4H_2PO_4$ was used as the starting material), 40 mol % of $SnCl_2$, 17 mol % of $PbCl_2$, and 3 mol % of $PbI_2$ was placed in an aluminum crucible, melted at 450° C. for 30 minutes, and then cast over a carbon plate.

Glass having a pure yellow color comparable to the glass of Example 1 was obtained.

EXAMPLE 3

7 g of $PbI_2$ was blended with 50 g of glass having a chemical composition of 79% by weight of PbO, 13% by weight of $B_2O_3$, and 8% by weight of $SiO_2$. The mixture was melted at 750° C. for 30 minutes, and then cast over a carbon plate.

Figure 2:
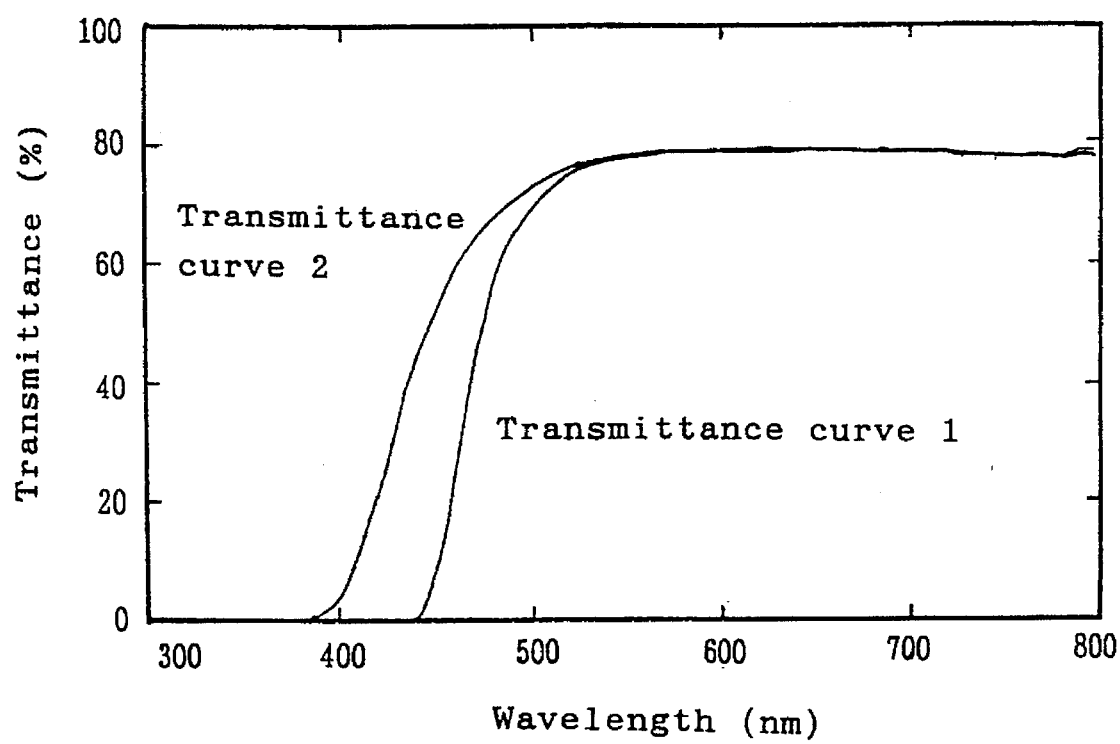
FIG. 2 is a graph showing the spectral transmittance of the yellow-colored glass according to the present invention, where the transmittance given is a value obtained by calculation for a thickness of 10 mm, the transmittance curve 2 shows the spectral transmittance of the comparative glass obtained without adding any iodine compound, and the transmittance curve 1 shows the spectral transmittance of the yellow-colored glass according to the present invention obtained in Example 3.

The spectral properties of the glass obtained are shown by the curve 1 in FIG. 2. A yellow glass having a transmission threshold wavelength (an absorption edge) of 440 nm was obtained. The chromaticity of this yellow glass shown in the standard colorimetric system CIE (monochromatic specification) is as follows: the lightness (Y) is 74.8%, the dominant wavelength ($\lambda d$) is 569.7 nm, and the excitation purity (Pe) is 58.8%.

A comparative glass was prepared by using the same base glass material as was used in Example 3, without adding any iodine compound. The transmittance curve of this comparative lead glass is shown by the curve 2 in FIG. 2. This curve demonstrates that the glass is very slightly tinged with yellow.

EXAMPLE 4

2.5 g of KI was blended with 50 g of glass having a chemical composition of 79% by weight of PbO, 13% by weight of $B_2O_3$, and 8% by weight of $SiO_2$. The mixture was melted at 750° C. for 30 minutes, and then cast over a carbon plate.

Yellow transparent glass comparable to the glass of Example 3 was obtained.

What is claimed is:

1. Yellow colored glass which is transparent to visible light comprising an iodine compound, wherein the yellow color is stable and results from the iodine, wherein the iodine compound is added to a base glass material comprising $P_2O_5$ and having a melting point of 500° C. or lower to produce a mixture and the mixture is melted to form the yellow colored glass, and wherein the transmission threshold wavelength of the yellow glass is from 440 nm to 520 nm.

2. The glass as claimed in claim 1, wherein the iodine compound is selected from the group consisting of iodine, $PbI_2$, $SnI_2$, $ZnI_2$, NaI and KI.

3. Yellow colored glass according to claim 1, wherein said transmission threshold wavelength of the yellow glass is less than 500 nm.

4. A method for producing yellow colored glass which is transparent to visible light comprising the steps of adding an iodine compound to a raw material used in glass production to form a mixture, said raw material comprising $P_2O_5$ and having a melting point less than 500° C., and forming yellow colored glass from the resulting mixture, wherein the yellow color is stable and results from the iodine.

5. The method as claimed in claim 4, wherein the step of forming glass includes melting the mixture.

6. The method as claimed in claim 4, wherein the iodine compound is selected from the group consisting of iodine, $PbI_2$, $SnI_2$, $ZnI_2$, NaI and KI.

7. A method for producing yellow colored glass which is transparent to visible light comprising the steps of adding an iodine compound to a base glass material comprising $P_2O_5$ to form a mixture, and forming yellow colored glass from the resulting mixture, wherein the yellow color is stable and results from the iodine.

8. The method as claimed in claim 7, wherein the base glass material is in solid form and the step of forming glass includes melting the mixture.

9. The method as claimed in claim 7, wherein the base glass material is in molten form.

10. The method as claimed in claim 7, wherein the iodine compound is selected from the group consisting of iodine, $PbI_2$, $SnI_2$, $ZnI_2$, NaI and KI.

* * * * *